Patented Nov. 17, 1931

1,832,450

UNITED STATES PATENT OFFICE

GEORG EBERT AND FRIEDRICH AUGUST FRIES, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF POLYMERIZATION PRODUCTS FROM DIOLEFINES

No Drawing. Application filed December 27, 1929, Serial No. 417,002, and in Germany January 25, 1929.

This invention relates to improvements in the manufacture and production of polymerization products from diolefines.

In the manufacture and production of polymerization products from diolefines, especially butadiene, but also others, such as isoprene and dimethylbutadiene and homologues thereof, in the presence of alkali metals, or alkaline earth metals or products containing the same, these being equivalents, in almost every case a certain time elapses before the reaction commences, and when it does commence it frequently proceeds in an undesirably vigorous manner.

We have now found that the commencement of the polymerization reaction may be accelerated and an untroubled, uniform course of the reaction may be obtained by carrying out the process in the presence of small amounts of cyclic di-ethers, such as dioxane (diethylene-1.4-dioxide) and its derivatives. Products having excellent plasticity and homogeneity are obtained which may be worked up by vulcanization into soft rubber-like products of high quality. Usually amounts up to about 10 per cent of the cyclic diether will suffice, although larger amounts may of course be employed. As a rule not more than 5 per cent of the said addition is employed.

The said polymerization may, if desired, be carried out in the presence or absence of solvents, or diluents, such as benzene, benzines, ether or the like.

The polymerization products thus obtained are excellently suitable for the production of films, threads etc. distinguished by great insensibility against heat and stability to light, for example by giving them the desired form and then hardening them by the action of heat or by treatment with sulphurizing agents.

The following examples will further illustrate the nature of this invention, but the invention is not restricted to these examples. The parts are by weight.

Example 1

A mixture of 2460 parts of butadiene and 125 parts of dioxane is heated to about 40° C. together with 10 parts of sodium (in the form of wire of about 1 millimeter in thickness) in a rotating iron autoclave. The reaction rapidly commences and proceeds very uniformly without appreciable increase in temperature or pressure, and the polymerization is completed after a period of 1½ days. A solid product is thus obtained, which may be worked up satisfactorily in so far as by vulcanization it gives excellent soft rubber.

Example 2

4000 parts of butadiene are polymerized in a rotary autoclave by the agency of 12 parts of sodium dust, with an addition of 40 parts of dioxane. The reaction sets in very rapidly at a temperature of about 60° C. and is completed in about 24 hours. A polymerization product of excellent quality is obtained.

What we claim is:

1. In the production of polymerization products of diolefines by polymerization in the presence of an alkali metal, the step of working in the presence of dioxane.

2. In the production of polymerization products of diolefines by polymerization in the presence of an alkali metal, the step of adding a small amount of dioxane.

3. In the production of polymerization products of butadiene by polymerization in the presence of sodium, the step of adding a small amount of dioxane.

4. A process for the polymerization of butadiene, which comprises treating butadiene with sodium dust in the presence of dioxane at a temperature of about 60° C.

In testimony whereof we have hereunto set our hands.

GEORG EBERT.
FRIEDRICH AUGUST FRIES.